United States Patent
Bestermann et al.

(10) Patent No.: US 9,912,667 B2
(45) Date of Patent: *Mar. 6, 2018

(54) MANAGING PRIVATE AND PUBLIC SERVICE SET UTILIZATION

(71) Applicant: ARRIS Enterprises LLC, Suwanee, GA (US)

(72) Inventors: John Randolph Bestermann, Suwanee, GA (US); Wade E. Carter, Johns Creek, GA (US); Kurt Alan Lumbatis, Dacula, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/583,454

(22) Filed: May 1, 2017

(65) Prior Publication Data

US 2017/0237743 A1 Aug. 17, 2017

Related U.S. Application Data

(63) Continuation of application No. 14/813,534, filed on Jul. 30, 2015, now Pat. No. 9,674,186.
(Continued)

(51) Int. Cl.
*H04L 29/06* (2006.01)
*H04W 12/06* (2009.01)
(Continued)

(52) U.S. Cl.
CPC ........ *H04L 63/101* (2013.01); *H04L 63/0876* (2013.01); *H04L 63/105* (2013.01);
(Continued)

(58) Field of Classification Search
CPC . H04L 63/0876; H04L 63/101; H04L 63/105; H04L 63/10; H04W 12/06;
(Continued)

(56) References Cited

U.S. PATENT DOCUMENTS

2009/0046644 A1* 2/2009 Krishnaswamy ..... H04W 12/06
370/329
2010/0265845 A1* 10/2010 Lampen .............. H04L 12/4641
370/254
(Continued)

*Primary Examiner* — Yogesh Paliwal
(74) *Attorney, Agent, or Firm* — Bart A. Perkins (57) ABSTRACT

Methods, systems, and computer readable media may be operable to facilitate the management of connections between one or more client devices and an access point over one or more service sets. An access point may maintain a list of client devices that have successfully associated with a private service set broadcast from the access point, and when a client device from the list attempts to connect to a public service set broadcast from the access point, the access point may deny the client device's attempt to connect to the public service set. Attempts by the client device to join the public service set may be denied for a predetermined number of attempts or a predetermined period of time. Denying an attempt to connect to a public service set may provide a client device with more opportunities to connect to a private service set broadcast from a corresponding access point.

17 Claims, 4 Drawing Sheets

Related U.S. Application Data

(60) Provisional application No. 62/034,479, filed on Aug. 7, 2014.

(51) Int. Cl.
*H04W 12/08* (2009.01)
*H04W 48/02* (2009.01)

(52) U.S. Cl.
CPC ............ *H04W 12/06* (2013.01); *H04W 12/08* (2013.01); *H04W 48/02* (2013.01)

(58) Field of Classification Search
CPC ..... H04W 12/08; H04W 48/02; H04W 48/18; H04W 84/12
USPC .......................................................... 726/4
See application file for complete search history.

(56) References Cited

U.S. PATENT DOCUMENTS

| | | |
|---|---|---|
| 2011/0182221 A1 | 7/2011 | Arakawa |
| 2012/0077488 A1* | 3/2012 | Unger .................. H04W 48/18 455/432.1 |
| 2014/0003408 A1 | 1/2014 | Chhabra et al. |

* cited by examiner

MANAGING PRIVATE AND PUBLIC SERVICE SET UTILIZATION

CROSS REFERENCE TO RELATED APPLICATION

This application is a Continuation of U.S. patent application Ser. No. 14/813,534 entitled "Managing Private and Public Service Set Utilization," filed on Jul. 30, 2015, which application claims priority as a non-provisional application of U.S. Provisional Application Ser. No. 62/034,479, entitled "Managing Connections to Service Sets," which was filed on Aug. 7, 2014, and is incorporated herein by reference in its entirety.

TECHNICAL FIELD

This disclosure relates to managing private and public service set utilization.

BACKGROUND

Typically, an access point such as a gateway device may provide a plurality of service sets to a customer premise for the delivery of wireless communications between the access point and one or more client devices or stations. Each respective one of the plurality of service sets may be designated for use by a specific service and may be encrypted or unencrypted (e.g., private or public). When a private service set and a public service set are broadcast from an access point, a client device may potentially connect to the public service set rather than the private service set. However, a user may intend or a specific service may require that communications be delivered between a client device and access point through a private service set. Therefore, it is desirable to improve upon methods, systems and apparatuses for managing connections between one or more client devices and an access point over one or more service sets.

BRIEF DESCRIPTION OF THE DRAWINGS

Like reference numbers and designations in the various drawings indicate like elements.

DETAILED DESCRIPTION

Methods, systems, and computer readable media are described herein for managing connections between one or more client devices and an access point over one or more service sets. In embodiments, an access point may maintain a list of client devices that have successfully associated with a private service set broadcast from the access point, and when a client device from the list attempts to connect to a public service set broadcast from the access point, the access point may deny the client device's attempt to connect to the public service set. Denying an attempt to connect to a public service set may provide a client device with more opportunities to connect to a private service set broadcast from a corresponding access point.

In embodiments, an access point may deny a predetermined number of public service set connection attempts from a client device and/or may deny public service set connection attempts from a client device for a predetermined period of time. After a predetermined number of attempts or period of time, a client device attempt to join a public service set may be allowed by a corresponding access point.

An embodiment of the invention described herein may include a method comprising: (a) receiving a request from a client device to join a public service set, wherein the public service set is provided by an access point; (b) determining that the client device is associated with a private service set, wherein the association between the client device and the private service set is based upon a prior authentication between the client device and the private service set; (c) determining whether a condition exists for allowing the client device to join the public service set; and (d) if the determination is made that no condition exists for allowing the client device to join the public service set: (i) denying the client device request to join the public service set; and (ii) outputting a message to the client device informing the client device of the denial of the request.

According to an embodiment of the invention, determining that the client device is associated with a private service set comprises identifying a media access control address associated with the client device in a list of media access control addresses associated with one or more devices that had previously been or that are currently associated with a private service set.

According to an embodiment of the invention, the request received from the client device to join the public service set comprises a subsequent attempt by the client device to join the public service set, and the condition for allowing the client device to join the public service set comprises the number of previous attempts by the client device to join the public service set being greater than a predetermined threshold.

According to an embodiment of the invention, the request received from the client device to join the public service set comprises a subsequent attempt by the client device to join the public service set, and the condition for allowing the client device to join the public service set comprises the passing of a predetermined duration of time between the time of a first attempt by the client device to join the public service set and the time of the subsequent attempt by the client device to join the public service set.

According to an embodiment of the invention, if the determination is made that a condition does exist for allowing the client device to join the public service set, the client device is allowed to join the public service set, and the client device is removed from a list of devices that have previously been or that are currently associated with a private service set.

According to an embodiment of the invention, the message informing the client device of the denial of the request comprises an identification of a frequency band to be probed by the client device for a private service set.

According to an embodiment of the invention, the message informing the client device of the denial of the request comprises a private service set identifier to be used by the client device in an attempt to join an associated private service set.

An embodiment of the invention described herein may include an apparatus comprising: (a) an interface configured to be used to receive a request from a client device to join a public service set; (b) one or more modules configured to: (i) determine that the client device is associated with a private service set, wherein the association between the client device and the private service set is based upon a prior authentication between the client device and the private service set; (ii) determine whether a condition exists for allowing the client device to join the public service set; and (iii) deny the client device request to join the public service set if the determination is made that no condition exists for allowing the client device to join the public service set; and (c) an interface configured to be used to output a message to the client device informing the client device of the denial of the request if the determination is made that no condition exists for allowing the client device to join the public service set.

An embodiment of the invention described herein may include one or more non-transitory computer readable media having instructions operable to cause one or more processors to perform the operations comprising: (a) receiving a request from a client device to join a public service set, wherein the public service set is provided by an access point; (b) determining that the client device is associated with a private service set, wherein the association between the client device and the private service set is based upon a prior authentication between the client device and the private service set; (c) determining whether a condition exists for allowing the client device to join the public service set; and (d) if the determination is made that no condition exists for allowing the client device to join the public service set: (i) denying the client device request to join the public service set; and (ii) outputting a message to the client device informing the client device of the denial of the request.

Figure 1:
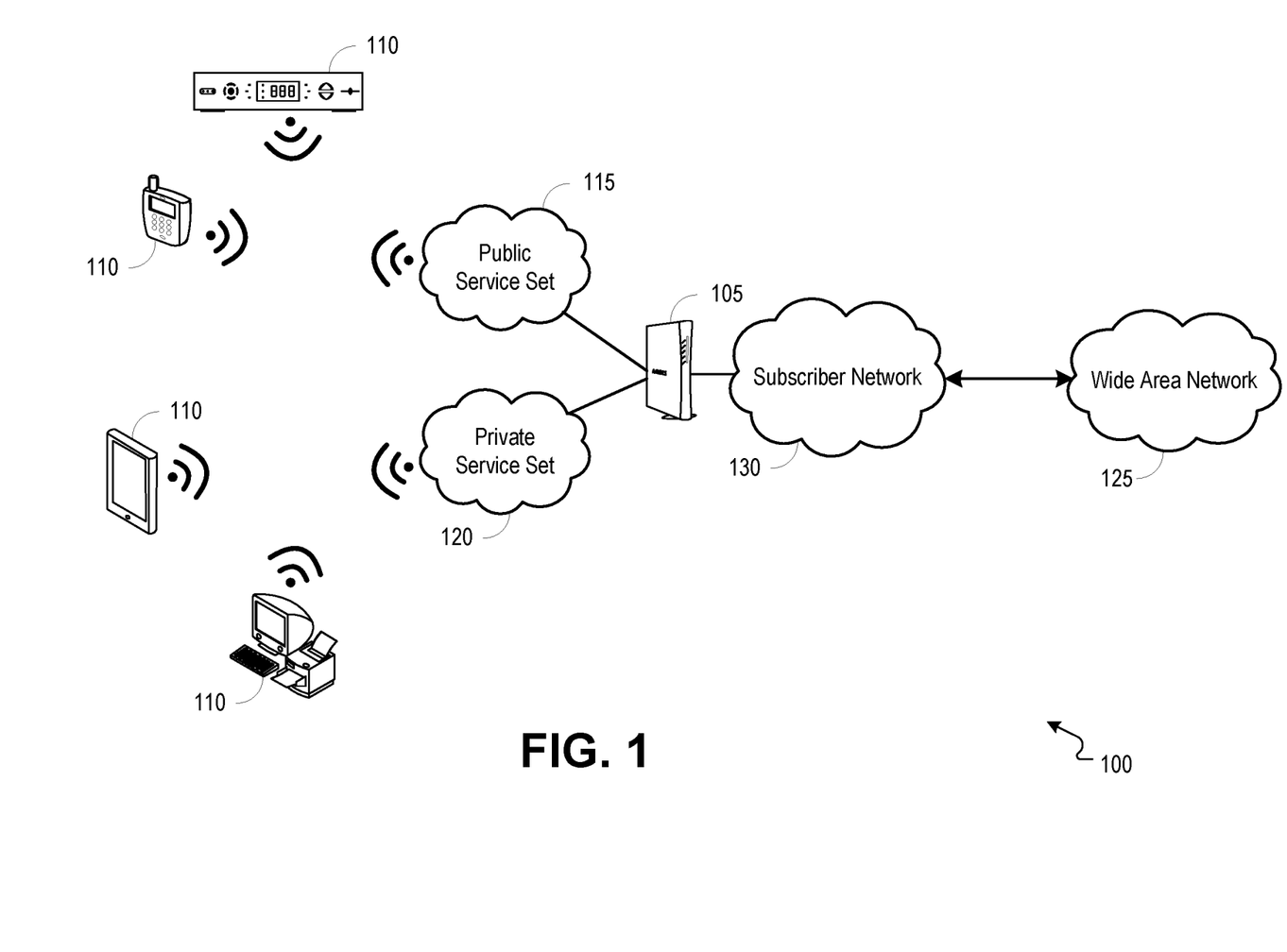
FIG. 1 is a block diagram illustrating an example network environment operable to facilitate the management of connections between one or more client devices and an access point over one or more service sets.

FIG. 1 is a block diagram illustrating an example network environment 100 operable to facilitate the management of connections between one or more client devices and an access point over one or more service sets. In embodiments, an access point 105 may route communications to and from one or more client devices 110. For example, the one or more client devices 110 may be provisioned to receive video service(s), data service(s), and/or voice services through one or more access points 105. In embodiments, an access point 105 may include a gateway, a cable modem, a wireless router including an embedded cable modem, a mobile hotspot router, a multimedia over coaxial alliance (MoCA) node, a wireless extender, and any other device that is operable to route communications to and from a client device 110.

In embodiments, client devices 110 may include a wide variety of devices such as televisions, mobile devices, tablets, set-top boxes, computers, and any other device that is capable of utilizing a video, data, or telephony service. In embodiments, an access point 105 may provide one or more service sets (e.g., public service set 115, private service set 120), and the service sets may be identified using unique service set identifiers (SSID). Service sets may be used for delivering traffic between a client device 110 and the access point 105, and each service set may be designated for a particular service (e.g., video, data, security, hotspot, etc.). In embodiments, the client devices 110 may identify a service set and may connect to a service set provided by the access point 105. Once connected to a service set, a client device 110 may receive content and/or services from upstream networks or servers (e.g., wide area network (WAN) 125), and may communicate with other client devices 110 connected to the same service set. For example, communications between client devices 110 and one or more access points 105 may include wireless communications (e.g., 802.11 packet exchanges).

In embodiments, an access point 105 may route communications between client device(s) 110 and a wide area network (WAN) 125 via a subscriber network 130. The subscriber network 130 may include various networks such as coaxial cable, optical fiber, twisted pair network, wireless networks including 4G and LTE, and others.

In embodiments, an access point 105 may maintain a list of known client devices 110. For example, the list of known client devices 110 may include client devices 110 that have successfully connected to a private service set 120 provided by the access point 105. A private service set 120 may include a service set that is password protected or that is otherwise encrypted. The access point 105 may identify and list known client devices 110 using media access control (MAC) addresses that are unique to the client devices 110. The known client device list may be stored at the access point 105 such that the list is maintained after reboots and software upgrades.

In embodiments, when a client device 110 attempts to connect to a public service set 115 provided by an access point 105, the access point 105 may identify the MAC address of the client device 110 and check whether the MAC address is in the list of known client devices 110 stored at the access point 105. For example, the MAC address of a client device 110 may be identified from a wireless communication (e.g., 802.11 packet) received from the client device 110. When the MAC address of the client device 110 is found in the list of known client devices 110, the access point 105 may make the determination that the preferred service set for the client device 110 is a private service set 120 and may deny the client device's attempt to join the public service set 115.

In embodiments, the access point 105 may deny a known client device's attempt to join the public service set 115 for a predetermined number of times and/or predetermined period of time. After the client device 110 has attempted to connect to the public service set 115 for a predetermined number of times or a predetermined period of time, the access point 105 may allow the client device 110 to connect to the public service set 115. When a client device 110 on the known device list is allowed to join the public service set 115, the client device 110 may be removed from the known device list until the client device 110 later successfully connects to a private service set 120.

Figure 2:
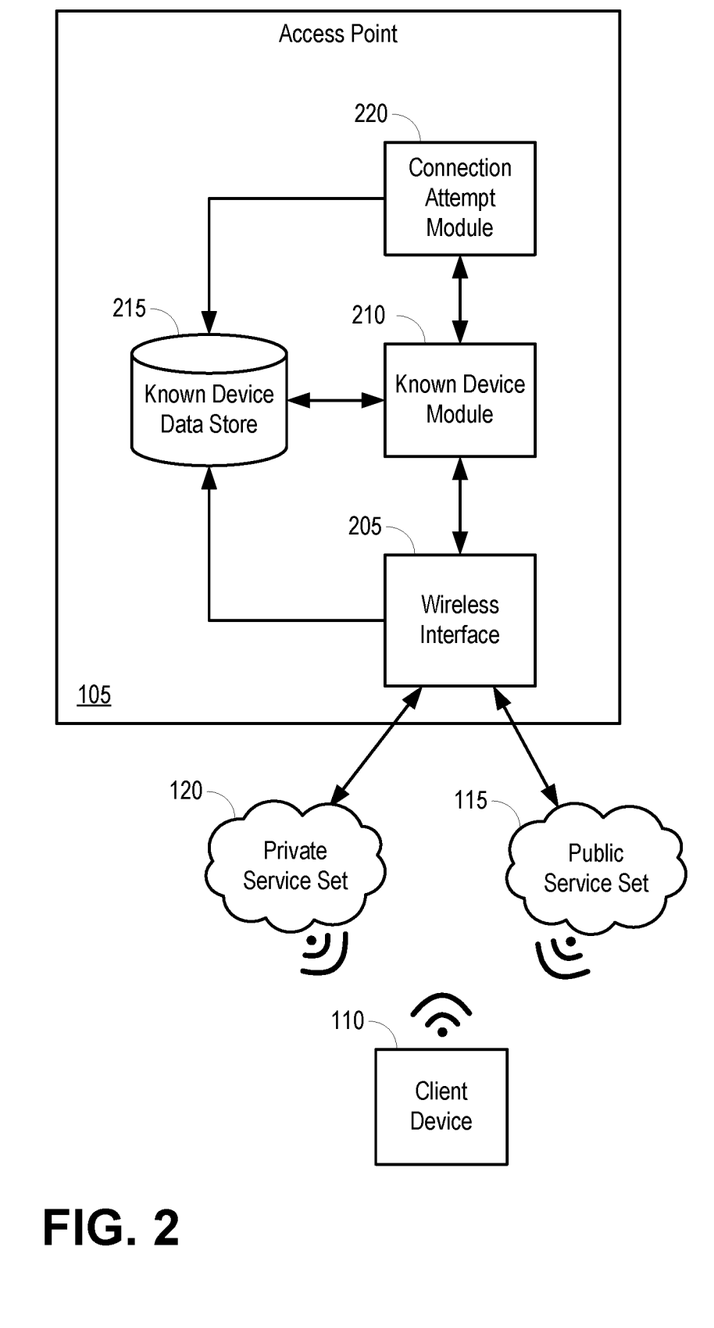
FIG. 2 is a block diagram illustrating an example access point operable to facilitate the management of connections between one or more client devices and an access point over one or more service sets.

FIG. 2 is a block diagram illustrating an example access point 105 operable to facilitate the management of connections between one or more client devices and an access point over one or more service sets. The access point 105 may include a wireless interface 205, a known device module 210, a known device data store 215, and a connection attempt module 220.

In embodiments, the access point 105 may route communications to and from client devices 110 through one or more service sets (e.g., private service set 120, public service set 115). For example, a client device 110 may identify an available service set (e.g., through a SSID associated with a service set), and can attempt to join the identified service set. It should be understood that communications exchanged between the access point 105 and client device 110 may include wireless communications (e.g., 802.11 packet exchanges).

In embodiments, a wireless interface 205 may receive requests from client devices 110 to join a service set. When a client device 110 successfully joins a private service set 120, a MAC address associated with the client device 110 may be added to a list of known client devices stored at the known device data store 215. In embodiments, the list of known client devices is updated when a client device completely authenticates to an encrypted service set.

In embodiments, the known device module 210 may identify a MAC address associated with a client device 110 when the client device 110 attempts to join a public service set 115. For example, the MAC address may be identified from a wireless communication (e.g., 802.11 packet) received from the client device 110. The known device module 210 may search for the identified MAC address in the list of known client devices. The access point 105 may ignore or withhold a response to a request to join a public service set received from a client device that is known (e.g., a client device included in the list of known client devices). For example, if the MAC address of a client device 110 is found within the list of known devices, the access point 105 may deny the client device's request to join a public service set 115. If the MAC address is not found in the list of known client devices, the client device 110 may be allowed to join the public service set 115.

In embodiments, a connection attempt module 220 may determine whether a client device 110 listed in a known device list has met or exceeded a predetermined number of connection attempts or whether a predetermined period of time has passed since the client device's first attempt to join the public service set 115. For example, a connection attempt count (e.g., a count of authentications tried to the public service set per MAC address) may be initiated when a client device 110 listed on the known device list attempts to connect to a public service set 115, and the count may be incremented each time the client device 110 subsequently attempts to join the public service set 115. If the connection attempt count for a requesting client device 110 is less than a predetermined threshold, the client device's attempt to join the public service set 115 may be denied. When the connection attempt count for a particular client device 110 reaches or exceeds a predetermined threshold, the client device 110 may be allowed to join the public service set 115. In embodiments, a sliding deny period may be configured such that the connection attempts of each MAC address is maintained over a predetermined period of time, and at the expiration of the sliding deny period, the attempt count for a corresponding MAC address may be reset or decremented. It should be understood that an attempt count for a MAC address may be reset when the corresponding client device successfully joins a private service set.

In embodiments, when a client device 110 listed in the known device list attempts to join the public service set 115, a timer may be initiated. If, when the client device 110 makes a subsequent attempt to join the public service set 115, the timer has yet to expire or is otherwise less than a predetermined threshold, the client device's attempt to join the public service set 115 may be denied. If, when the client device 110 makes a subsequent attempt to join the public service set 115, the timer has expired or is otherwise greater than a predetermined threshold, the client device's attempt to join the public service set 115 may be allowed.

When a known client device 110 makes an initial attempt to join a public service set 115, the time of the initial attempt may be logged (e.g., at the known device data store), and when a subsequent attempt to join the public service set 115 is made by the known client device 110, the period of time between the initial attempt and the subsequent attempt may be used to determine whether to allow the known client device 110 to join the public service set 115. For example, where the difference between the time of an initial attempt by the known client device 110 to join a public service set 115 and the subsequent attempt by the known client device 110 to join the public service set 115 is greater than a threshold period of time (e.g., thirty, sixty, ninety seconds, etc.), the access point 105 may allow the known client device 110 to join the public service set 115. A logged time of an initial attempt by a known client device 110 to join a public service set 115 may be reset or deleted from an access point 105 (e.g., known device data store 215) after the passing of a predetermined duration of time (e.g., five, ten minutes, etc.).

In embodiments, when a client device 110 listed in the known device list is allowed to join the public service set 115, the client device 110 may be removed from the known device list stored at the known device data store 215. In embodiments, an operator may configure the deny period, the predetermined attempt threshold, and/or the list of known devices.

Figure 3:
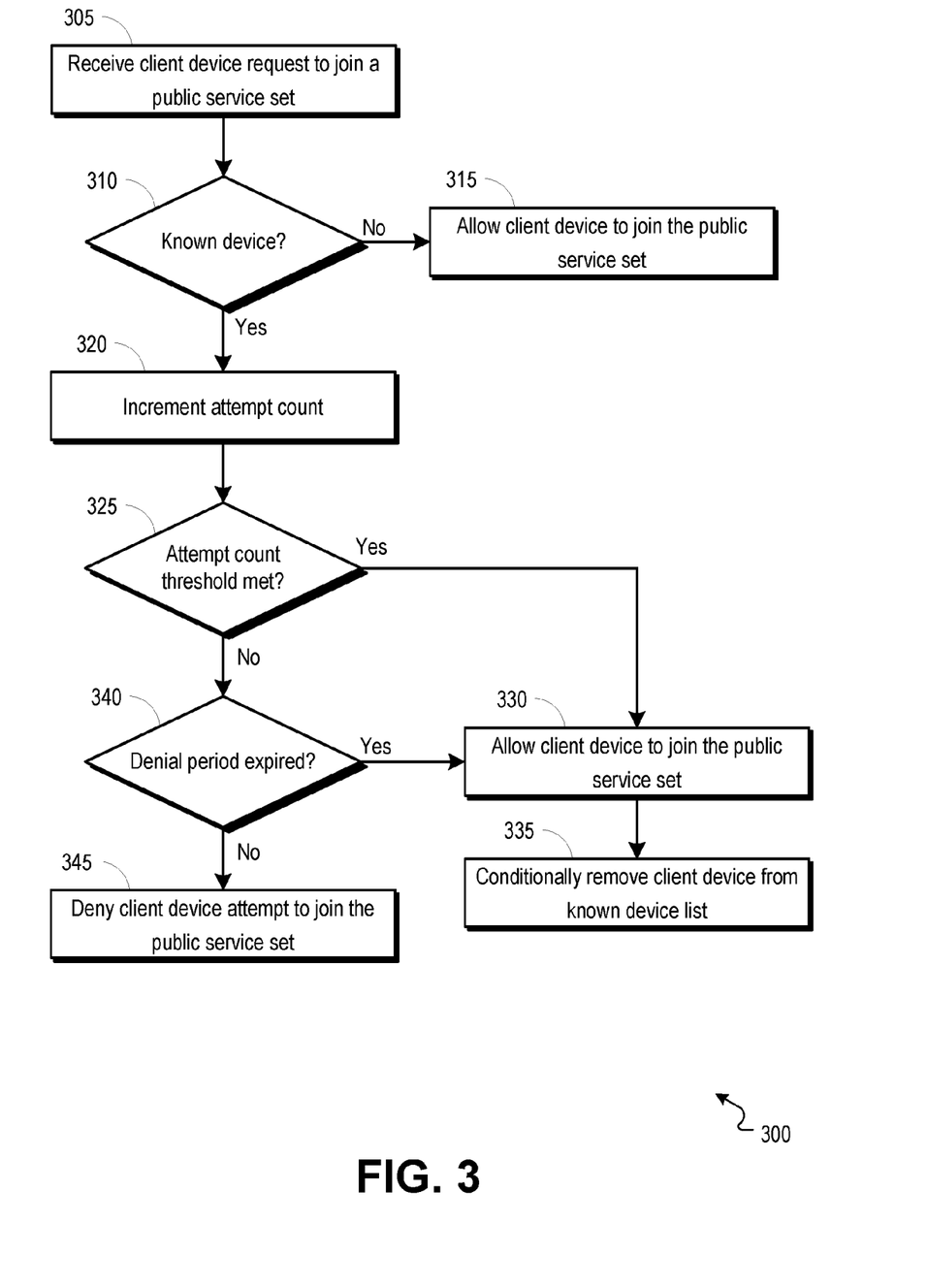
FIG. 3 is a flowchart illustrating an example process operable to facilitate the management of connections between one or more client devices and an access point over one or more service sets.

FIG. 3 is a flowchart illustrating an example process 300 operable to facilitate the management of connections between one or more client devices and an access point over one or more service sets. In embodiments, an access point 105 of FIG. 1 may manage connections between client devices (e.g., client devices 110 of FIG. 1) and service sets offered by the access point 105. The process 300 may begin at 305, when a client device 110 request to join a public service set is received at an access point 105. For example, a client device 110 request to join a public service set may include a probe request or authentication request identifying a public SSID.

At 310, a determination may be made whether the client device 110 requesting to join the public service set is a known device (e.g., a device that has been previously connected to a private service set of an associated access point). The determination whether the client device 110 is a known device may be made, for example, by the known device module 210 of FIG. 2. In embodiments, the known device module 210 can search for a MAC address associated with the requesting client device 110 in a list of known devices (e.g., previously connected devices) stored at the known device data store 215 of FIG. 2. If the MAC address of the client device 110 is not found in the list of known devices, the determination can be made that the client device 110 is not a known device and the process may proceed to 315 where the client device 110 may be allowed to join the public service set. For example, at 315, the access point 105 may allow the client device 110 to associate and/or authenticate with the requested public service set.

If, at 310, the MAC address of the requesting client device 110 is found in the list of known devices, the determination may be made that the client device 110 is a known device and the process 300 may proceed to 320. At 320, a count of the number of attempts the client device 110 has made to join the public service set may be incremented. In embodiments, a MAC address and attempt count associated with the known client device 110 may be stored at the access point 105 (e.g., at known device data store 215 of FIG. 2). Each time an attempt is made by the client device 110 to join the public service set provided by the access point 105, the attempt count associated with the client device 110 may be incremented.

At 325, a determination may be made whether the client device 110 has attempted to join the public service set a number of times that is greater than a predetermined threshold. The determination may be made, for example, by the connection attempt module 220 of FIG. 2. For example, a count of the number of times a client device 110 attempts to join the public service set may be maintained. The attempt count associated with a specific MAC address may be associated with a period of time, such that the attempt count for the MAC address is reset after a predetermined period of time.

If, at 325, the determination is made that the attempt count has exceeded the predetermined threshold, the process 300 may proceed to 330. At 330, the client device 110 may be allowed to join the requested public service set. For example, the access point 105 may allow the client device 110 to associate and/or authenticate with the requested public service set.

At 335, the client device 110 may be conditionally removed from the known device list. In embodiments, the MAC address and associated attempt count of the client device 110 may be removed from the list of known devices stored at the known device data store 215 of FIG. 2. For example, the client device 110 may be removed from the known device list until the client device 110 is later associated and/or authenticated with a private service set provided by the access point 105.

Returning to 325, if the determination is made that the attempt count has not exceeded the predetermined threshold, the process 300 may proceed to 340. At 340, a determination may be made whether a denial period has expired. The determination may be made, for example, by the connection attempt module 220 of FIG. 2. The denial period may be a predetermined amount of time for which to deny a client device's attempt to join a public service set after the client device's first attempt to join the public service set. If the denial period has expired, the process 300 may proceed to 330, where the client device 110 may be allowed to join the public service set, and the client device 110 may be conditionally removed from the known device list at 335.

If, at 340, the determination is made that the denial period has not expired, the process 300 may proceed to 345. At 345, the client device's attempt to join the public service set may be denied. In embodiments, the access point 105 may output an authentication response informing the client device 110 that another network or service set is preferred for the client device 110. For example, in response to an authentication request received from the client device 110, the access point 105 may output an authentication response including a status code indicating that another network or SSID is preferred for the client device 110. In embodiments, the authentication response may inform the client device 110 as to which specific network or SSID is preferred for the client device 110. For example, the authentication response may include a specific frequency band (e.g., 2.4 GHz, 5 GHz, etc.) and/or an identification of the preferred SSID, and using the information included within the authentication response, the client device 110 may attempt to associate and/or authenticate with the preferred SSID. If the access point 105 is configured not to broadcast SSIDs, a preferred SSID field within the authentication response may be left blank. In embodiments, the authentication response may inform the client device 110 to only probe a frequency band defined in the authentication response.

Figure 4:
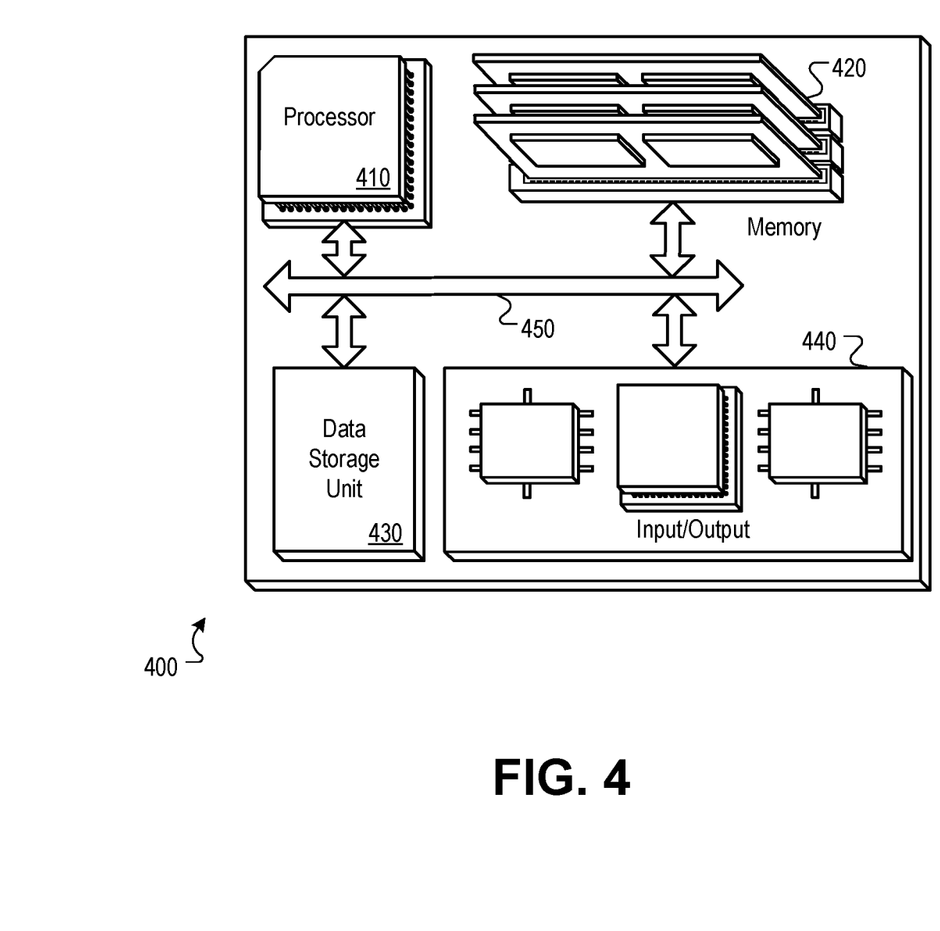
FIG. 4 is a block diagram of a hardware configuration operable to facilitate the management of connections between one or more client devices and an access point over one or more service sets.

FIG. 4 is a block diagram of a hardware configuration 400 operable to facilitate the management of connections between one or more client devices and an access point over one or more service sets. It should be understood that the hardware configuration 400 can exist in various types of devices. The hardware configuration 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit.

In some implementations, the storage device 430 can be capable of providing mass storage for the hardware configuration 400. In one implementation, the storage device 430 can be a computer-readable medium. In various different implementations, the storage device 430 can, for example, include a hard disk device, an optical disk device, flash memory or some other large capacity storage device. In other implementations, the storage device 430 can be a device external to the hardware configuration 400.

The input/output device 440 provides input/output operations for the hardware configuration 400. In embodiments, the input/output device 440 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In embodiments, the input/output device can include driver devices configured to send communications to, and receive communications from one or more networks (e.g., subscriber network 130 of FIG. 1, WAN 125 of FIG. 1, etc.) and/or one or more service sets (e.g., public service set 115, private service set 120, etc.).

Those skilled in the art will appreciate that the invention improves upon methods and apparatuses for managing connections between one or more client devices and an access point over one or more service sets. The methods, systems and apparatuses described in this disclosure enable the denial of a client device attempt to join a public service set when the client device has been previously associated with a private service set, wherein the private service set and the public service set are associated with the same access point. The methods, systems and apparatuses described in this disclosure increase the likelihood that a client device will connect to a private service set.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
receiving a request from a client device to join a first service set, wherein the first service set is provided by an access point;
determining that the client device is associated with a second service set, wherein the association between the client device and the second service set is based upon a prior authentication between the client device and the second service set;
determining whether a condition exists for allowing the client device to join the first service set; and
if the determination is made that no condition exists for allowing the client device to join the first service set:
denying the client device request to join the first service set; and
outputting a message to the client device informing the client device of the denial of the request; and
if the determination is made that a condition does exist for allowing the client device to join the first service set:
allowing the client device to join the first service set; and
removing the client device from a list of devices that have previously been or that are currently associated with a second service set.

2. The method of claim 1, wherein determining that the client device is associated with a second service set comprises identifying a media access control address associated with the client device in a list of media access control addresses associated with one or more devices that had previously been or that are currently associated with a second service set.

3. The method of claim 1, wherein the request received from the client device to join the first service set comprises a subsequent attempt by the client device to join the first service set, and wherein the condition for allowing the client device to join the first service set comprises the number of previous attempts by the client device to join the first service set being greater than a predetermined threshold.

4. The method of claim 1, wherein the request received from the client device to join the first service set comprises a subsequent attempt by the client device to join the first service set, and wherein the condition for allowing the client device to join the first service set comprises the passing of a predetermined duration of time between the time of a first attempt by the client device to join the first service set and the time of the subsequent attempt by the client device to join the first service set.

5. The method of claim 1, wherein the message informing the client device of the denial of the request comprises an identification of a frequency band to be probed by the client device for a second service set.

6. The method of claim 1, wherein the message informing the client device of the denial of the request comprises a second service set identifier to be used by the client device in an attempt to join an associated second service set.

7. An apparatus comprising:
an interface that receives a request from a client device to join a first service set;
one or more modules that:
determine that the client device is associated with a second service set, wherein the association between the client device and the second service set is based upon a prior authentication between the client device and the second service set;
determine whether a condition exists for allowing the client device to join the first service set; and
deny the client device request to join the first service set if the determination is made that no condition exists for allowing the client device to join the first service set; and
an interface that outputs a message to the client device informing the client device of the denial of the request if the determination is made that no condition exists for allowing the client device to join the first service set, wherein the message informing the client device of the denial of the request comprises an identification of a frequency band to be probed by the client device for a second service set.

8. The apparatus of claim 7, wherein it is determined that the client device is associated with a second service set by identifying a media access control address associated with the client device in a list of media access control addresses associated with one or more devices that had previously been or that are currently associated with a second service set.

9. The apparatus of claim 7, wherein the request received from the client device to join the first service set comprises a subsequent attempt by the client device to join the first service set, and wherein the condition for allowing the client device to join the first service set comprises the number of previous attempts by the client device to join the first service set being greater than a predetermined threshold.

10. The apparatus of claim 7, wherein the request received from the client device to join the first service set comprises a subsequent attempt by the client device to join the first service set, and wherein the condition for allowing the client device to join the first service set comprises the passing of a predetermined duration of time between the time of a first attempt by the client device to join the first service set and the time of the subsequent attempt by the client device to join the first service set.

11. The apparatus of claim 7, wherein the message informing the client device of the denial of the request comprises a second service set identifier to be used by the client device in an attempt to join an associated second service set.

12. One or more non-transitory computer readable media having instructions operable to cause one or more processors to perform the operations comprising:

receiving a request from a client device to join a first service set, wherein the first service set is provided by an access point;
determining that the client device is associated with a second service set, wherein the association between the client device and the second service set is based upon a prior authentication between the client device and the second service set;
determining whether a condition exists for allowing the client device to join the first service set; and
if the determination is made that no condition exists for allowing the client device to join the first service set:
denying the client device request to join the first service set; and
outputting a message to the client device informing the client device of the denial of the request; and
if the determination is made that a condition does exist for allowing the client device to join the first service set:
allowing the client device to join the first service set; and
removing the client device from a list of devices that have previously been or that are currently associated with a second service set.

13. The one or more non-transitory computer-readable media of claim 12, wherein determining that the client device is associated with a second service set comprises identifying a media access control address associated with the client device in a list of media access control addresses associated with one or more devices that had previously been or that are currently associated with a second service set.

14. The one or more non-transitory computer-readable media of claim 12, wherein the request received from the client device to join the first service set comprises a subsequent attempt by the client device to join the first service set, and wherein the condition for allowing the client device to join the first service set comprises the number of previous attempts by the client device to join the first service set being greater than a predetermined threshold.

15. The one or more non-transitory computer-readable media of claim 12, wherein the request received from the client device to join the first service set comprises a subsequent attempt by the client device to join the first service set, and wherein the condition for allowing the client device to join the first service set comprises the passing of a predetermined duration of time between the time of a first attempt by the client device to join the first service set and the time of the subsequent attempt by the client device to join the first service set.

16. The one or more non-transitory computer-readable media of claim 12, wherein the message informing the client device of the denial of the request comprises an identification of a frequency band to be probed by the client device for a second service set.

17. The one or more non-transitory computer-readable media of claim 12, wherein the message informing the client device of the denial of the request comprises a second service set identifier to be used by the client device in an attempt to join an associated second service set.

* * * * *